United States Patent [19]

Winsel

[11] 4,363,855
[45] Dec. 14, 1982

[54] GALVANIC PRIMARY ELEMENT

[75] Inventor: Aügüt Winsel, Kelkheim, Fed. Rep. of Germany

[73] Assignee: Varta Batterie Aktiengesellschaft, Hanover, Fed. Rep. of Germany

[21] Appl. No.: 169,960

[22] Filed: Jul. 18, 1980

[30] Foreign Application Priority Data

Jul. 25, 1979 [DE] Fed. Rep. of Germany ....... 2930099

[51] Int. Cl.$^3$ .......................................... H01M 12/02
[52] U.S. Cl. ..................................... 429/101; 429/105
[58] Field of Search .................. 429/101, 105, 27, 29, 429/40–46, 12, 218, 53

[56] References Cited

U.S. PATENT DOCUMENTS

| | | | |
|---|---|---|---|
| 3,201,282 | 8/1965 | Justi et al. | 429/40 X |
| 3,284,238 | 11/1966 | White | 429/46 X |
| 3,446,671 | 5/1969 | Kring | 429/46 |
| 3,758,339 | 9/1973 | Marion | 429/40 X |
| 4,057,675 | 11/1977 | Halberstadt et al. | 429/101 X |

*Primary Examiner*—Anthony Skapars
*Attorney, Agent, or Firm*—Weiser, Stapler & Spivak

[57] ABSTRACT

A galvanic primary element of the system $Li/H_2O_2$ comprises a gas diffusion electrode which separates the lithium electrode from the cathode space which is filled with aqueous $H_2O_2$ solution. In the working layer which is flanked by capillary active cover layers of the gas diffusion electrode, automatically drawn-in $H_2O_2$ is decomposed into $H_2O_2$ and $O_2$ catalytically until the gas pressure is in equilibrium with capillary forces and thereby interrupts the access of additional $H_2O_2$ solution to the working layer. Short circuiting of the cell or connection of a load causes a reduction of the gas pressure due to electrochemical reaction of the $O_2$ with the lithium so that fresh reactant solution can flow in. A reaction regime matching the current draw becomes possible because of the property of polyurethane to gel in aqueous $H_2O_2$ by virtue of the fact that the $H_2O_2$ is slowly pressed out of the gel as out of a sponge by means of a ram toward the gas diffusion electrode.

14 Claims, 1 Drawing Figure

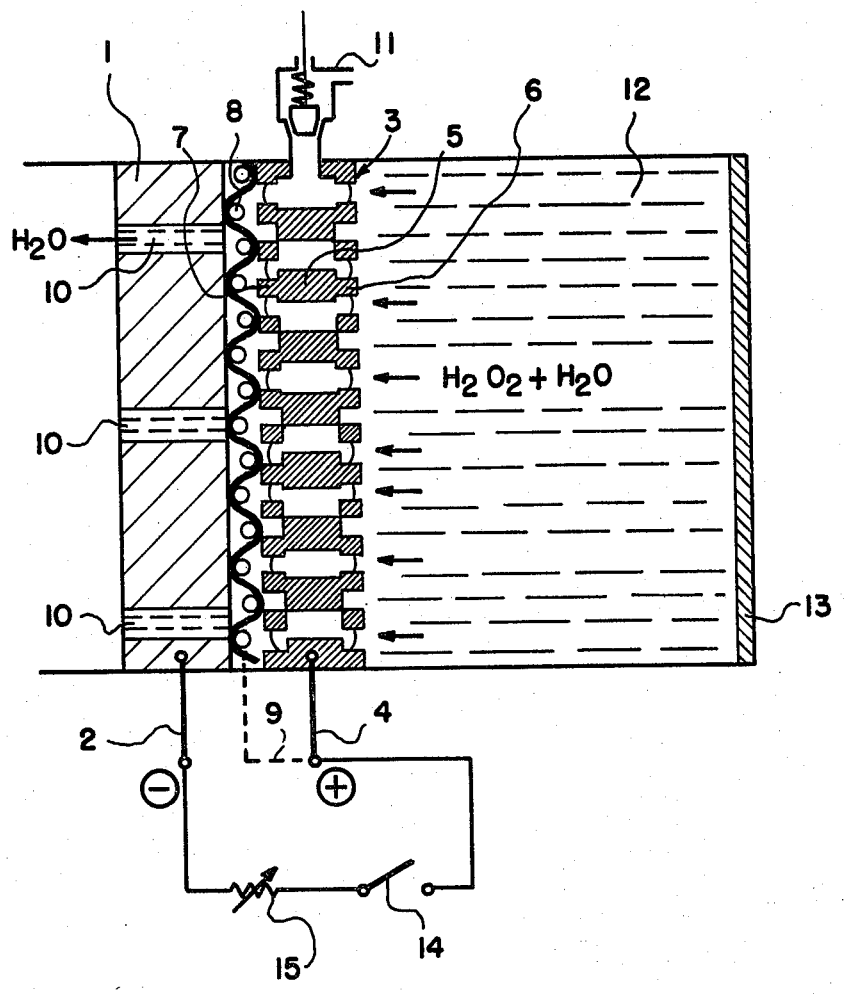

GALVANIC PRIMARY ELEMENT

The invention relates to a galvanic primary element having a negative light metal electrode and having $H_2O_2$ as the cathode depolarizer.

The high energy content of light metal electrode which results from their strongly electropositive properties, and particularly those of alkaline metals, was originally susceptible of being used only in water-free electrochemical systems in which, under appropriate conditions, a gaseous oxidizing means was dissolved as cathode depolarizer in an organic solvent, for example, in the $Li/SO_2$ system.

In the meantime, primary elements have also become known which, as for example, the $Li/H_2O_2$ cell, contain a highly reactive alkaline metal as negative electrode and an aqueous medium in contact with same as the positive electrode material. In a manner similar to some fuel cells, in which liquid or dissolved reactants such as hydrazene, sodium boronate, alcohols or hydrogen peroxide are continuously supplied to the catalytically active electrodes, in the above-mentioned primary elements, the negative electrode is also continuously supplied with the liquid depolarizer.

The ease of reaction of the lithium metal however, causes good utilization of the current productive process to take place only during periods of high current loads. During operating pauses or during periods of lower current draw, parasitic reactions increasingly come into play. These lead to premature consumption of the negative electrode in addition to unwanted gas evolution.

Accordingly, it is an object of the present invention to provide a primary element having a negative light metal electrode and $H_2O_2$ as the cathode depolarizer, and in which the current producing process either proceeds freely or is slowed down as a function of the prevailing demand.

This and other objects which will appear are achieved in accordance with the present invention by positioning ahead of the light metal electrode, a gas diffusion electrode, which consists of a catalytically active working layer and of cover layers positioned on either side of same and which are inactive. The cover layers have a smaller pore diameter than the working layer.

As negative electrode materials for the primary element embodying the invention, all light metals of the group Li, Mg, Ca, Al and Zn, but preferably Li and also alloys of these metals, are suitable.

For further details, reference is made to the discussion which follows in light of the accompanying drawings wherein the single FIGURE diagrammatically illustrates the construction of a primary element embodying the invention.

Referring to that FIGURE, the embodiment of the invention shown therein consists in its essence of a plate-like, light metal electrode 1 with a negative take-off conductor 2 and the three-layer porous gas diffusion electrode 3 with the positive current take-off 4 which is positioned ahead of the light metal electrode. The gas diffusion electrode as such is known in principle from German Pat. No. 1,241,812. Its central layer 5 contains as the working layer a catalyst of finely divided silver which is present in the form of Raney silver or by precipitation upon a sintered carbonyl nickel frame. The inactive cover layers 6, 7, which are hydrophilic like the working layer, may also be made of sintered carbonyl nickel or of asbestos. What is essential for the operation of a cell is that the cover layers have a smaller pore radius than the working layer.

The small space between the light metal electrode 1 and the gas diffusion electrode 3 is a collection point for the reaction products which are produced during current draw. This space is filled with a net or with a coarsely meshed grid structure 8 made of spacers. The grid structure 8 may be of plastic or may also be a metal grid, for example, a nickel or iron mesh. If a metallic embodiment is used, then the grid structure 8 may be short-circuited to the current take-off 4 of gas diffusion electrode 3 by its current take-off 9. Alternatively, it can perform the function of the current take-off by being in direct electronic contact with the gas diffusion electrode.

In the light metal electrode 1, channels 10 are provided for the removal of the reaction products which are produced during the operation of the cell. The working layer 5 is in communication with an excess pressure relief valve 11. The cathode space 12 is filled with aqueous $H_2O_2$ solution and closed by a solid partition 13 which may, however, also be replaced by a movable ram (not shown).

The operation of the element embodying the invention is as follows.

Through the capillary action of the cover layer 6 which faces the cathode space 12, reactant solution is automatically drawn or sucked in and transported into the working layer 5. There, the $H_2O_2$ decomposes at the catalyst to form $H_2O$ and $O_2$. In so doing, an oxygen pressure is built up in the working layer 5 which, however, is not sufficient to overcome the capillary pressure within the small pore cover layers 6, 7 and to displace the liquid therefrom. There remains, therefore, in existence within the working layer 6 a gas bubble or "pillow" which, in the rest condition of the cell, acts as a reaction inhibitor because it prevents additional reactant solution from reaching the catalyst. Only the water which is formed by decomposition is taken up by the capillary active cover layer 7 and further transported to the light metal electrode 1. There it forms on the metal surface a temporary protective hydroxide skin.

If the cell is now short-circuited by means of a switch 14, then a rapid reduction in size of the gas bubble takes place due to the electrochemical reaction of the oxygen with the light metal. As a result, fresh $H_2O_2$ solution can resume flowing into the working layer and there be decomposed. The water which is formed in this process flows out through the capillaries of the cover layer 7 and is ultimately completely removed from the reaction space by the channel structures 10 in the light metal electrode 1.

Interruption or reduction of the current outflow, as by adjustment of variable resistor 15, automatically leads to renewed growth of the gas bubble within the working layer 5. The current-producing reaction then stops and is again set into operation when the loading resumes.

In this manner, there takes place a reaction regime which is self-regulating by means of the oxygen pressure within the element embodying the invention. In case of extremely high oxygen pressures, the gas diffusion electrode 3 can be vented through pressure relief valve 11.

If the light metal electrode is of lithium, then the water which escapes from the cover layer 7 is capable of dissolving the primarily produced lithium hydroxide which is easily soluble and removing it to the outside through the channels 10. However, the reactant slution should be diluted only to the extent to which the available quantity of water is just sufficient for dissolving the lithium hydroxide. This is in order to preserve the highest possible depolarizer concentration. In accordance with the invention, an $H_2O_2$ solution of about 3 to 15 percent and preferably 5 to 10 percent is used.

A reaction regime which matches the current demand is also possible if the $H_2O_2$ solution is fixated in a gel of the plastic polyurethane from which it can then be pressed out progressively as from a sponge. The reason is that polyurethane is especially capable of gel formation in relation to aqueous liquids, it possesses a stable structure and, in that case, fixates the trapped water and hydrogen peroxide like a sponge. Thus, the polyurethane gel forms a store in which the reactant solution is present as a solid material and from which it can be delivered by steady pressure toward the cover layer of the gas diffusion electrode.

This pressure takes place by means of a ram (not shown) which fills the entire cross section of the cathode space. However, the pressure exerted by the ram should always be smaller than the oxygen pressure in the working layer.

I claim:

1. A galvanic primary element having a negative light metal electrode and having hydrogen peroxide as the cathode depolarizer, comprising:
   a gas diffusion electrode positioned in front of the light metal electrode,
   said gas diffusion electrode having a catalytically active working layer and having inactive cover layers positioned on both sides of the working layer,
   the cover layers having a smaller pore diameter than the working layer, and
   the hydrogen peroxide being present in aqueous solution of about 3 to 15 percent fixated in a polyurethane gel.
2. The element of claim 1 wherein
   the light metal electrode is a lithium electrode.
3. The element of claim 1 wherein the solution is between 5 to 10 percent.
4. The element of claim 1 wherein
   the polyurethane gel is adapted to be pressed toward the cover layer of the gas diffusion electrode.
5. The element of claim 1 wherein
   there is a space between the light metal electrode and the gas diffusion electrode,
   said space being occupied by a mesh or a coarsely meshed grid structure formed of spacers.
6. The element of claim 5 wherein
   the grid structure is a synthetic plastic grid.
7. The element of claim 5 wherein the grid structure is a metal grid.
8. The element of claim 7 wherein
   the metal grid and the gas diffusion electrode are electrically connected together.
9. The element of claim 1 wherein
   electrolyte for the element is produced within the working layer by decomposition of the hydrogen peroxide,
   and
   the electrolyte so produced is supplied to the light metal electrode through the cover layer nearest the last-named electrode.
10. The element of claim 9 wherein
    the electrolyte is the water formed by decomposition of the hydrogen peroxide.
11. The element of claim 10 wherein
    the hydrogen peroxide reaches the working layer through the cover layer farthest from the light metal electrode.
12. The element of claim 11 wherein
    the oxygen formed by decomposition of hydrogen peroxide in the working layer forms a gas bubble in the working layer, which varies in size to provide a self-regulating regime for the current producing reaction.
13. The element of claim 12 which further comprises a pressure relief valve for the working layer.
14. The element of claim 1 wherein
    the light metal electrode has channels for the electrolyte to flow out through said light metal electrode.

* * * * *